(12) United States Patent
Dawoud Shenouda Dawoud et al.

(10) Patent No.: US 10,362,031 B2
(45) Date of Patent: Jul. 23, 2019

(54) ESTABLISHING TRUST BETWEEN TWO DEVICES

(71) Applicant: Microsoft Technology Licensing, LLC, Redmond, WA (US)

(72) Inventors: Peter Dawoud Shenouda Dawoud, Redmond, WA (US); Anoosh Saboori, Seattle, WA (US); Himanshu Soni, Bothell, WA (US); Dustin Michael Ingalls, Carnation, WA (US); Nelly L. Porter, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/629,508

(22) Filed: Jun. 21, 2017

(65) Prior Publication Data
US 2017/0289157 A1 Oct. 5, 2017

Related U.S. Application Data

(62) Division of application No. 14/640,538, filed on Mar. 6, 2015, now Pat. No. 9,716,716.
(Continued)

(51) Int. Cl.
*G06F 21/44* (2013.01)
*H04L 29/06* (2006.01)
(Continued)

(52) U.S. Cl.
CPC ........ *H04L 63/0876* (2013.01); *H04L 9/0825* (2013.01); *H04L 9/3236* (2013.01);
(Continued)

(58) Field of Classification Search
None
See application file for complete search history.

(56) References Cited

U.S. PATENT DOCUMENTS 5,978,475 A * 11/1999 Schneier ............. G06F 21/6209
713/164
6,304,974 B1 10/2001 Samar
(Continued)

FOREIGN PATENT DOCUMENTS

| CN | 104168269 A | 11/2014 |
| EP | 2154825 A1 | 2/2010 |
| JP | 2000349747 A | 12/2000 |

OTHER PUBLICATIONS

The Trustworthiness Based on Hash Chain in Wireless Sensor network. Peng et al. IEEE. (Year: 2008).*
(Continued)

*Primary Examiner* — Venkat Perungavoor
(74) *Attorney, Agent, or Firm* — Newport IP, LLC; Jacob P. Rohwer

(57) ABSTRACT

Techniques described herein leverage a trusted entity within a domain to enable devices to establish trust with one another so they can securely discover each other and connect to one another. In various examples discussed herein, a device is configured to provide trust information to, and/or receive trust information from, the trusted entity. The trust information may include, for example, a public key of an encryption key pair, a certificate signed by the trusted entity proving authenticity, and/or a hash function and a hash seed used to compute a series of results that form a hash chain. The device may use the trust information to discover another device and to connect to the other device securely and automatically (e.g., with no user involvement or limited user involvement). Moreover, the device may use the trust information to dynamically change a MAC address being used to communicate with the other device.

20 Claims, 8 Drawing Sheets

Related U.S. Application Data

(60) Provisional application No. 62/051,833, filed on Sep. 17, 2014.

(51) Int. Cl.
  *H04L 9/08* (2006.01)
  *H04L 9/32* (2006.01)
  *H04L 12/743* (2013.01)

(52) U.S. Cl.
  CPC ........ *H04L 9/3265* (2013.01); *H04L 63/0442* (2013.01); *H04L 63/062* (2013.01); *H04L 63/0823* (2013.01); *H04L 63/0853* (2013.01); *H04L 2209/38* (2013.01)

(56) References Cited

U.S. PATENT DOCUMENTS

| | | | |
|---|---|---|---|
| 6,731,633 B1 * | 5/2004 | Sohor | H04L 9/0643 370/392 |
| 6,772,331 B1 | 8/2004 | Hind et al. | |
| 6,829,651 B1 | 12/2004 | Bass et al. | |
| 7,096,354 B2 | 8/2006 | Wheeler et al. | |
| 8,239,549 B2 | 8/2012 | Aura et al. | |
| 8,316,237 B1 | 11/2012 | Felsher et al. | |
| 8,327,128 B1 | 12/2012 | Prince et al. | |
| 8,594,632 B1 | 11/2013 | Azizi et al. | |
| 8,689,311 B2 | 4/2014 | Blinn et al. | |
| 8,752,161 B1 | 6/2014 | Thai et al. | |
| 8,761,398 B2 | 6/2014 | Koster et al. | |
| 8,832,783 B2 | 9/2014 | Ben-Shalom et al. | |
| 2005/0091545 A1 * | 4/2005 | Soppera | G06F 21/64 726/19 |
| 2005/0114666 A1 * | 5/2005 | Sudia | H04L 9/3236 713/175 |
| 2005/0182727 A1 | 8/2005 | Robert et al. | |
| 2007/0055867 A1 | 3/2007 | Kanungo et al. | |
| 2007/0133803 A1 | 6/2007 | Saito et al. | |
| 2008/0235511 A1 | 9/2008 | O—Brien et al. | |
| 2009/0119407 A1 | 5/2009 | Krishnan | |
| 2011/0119489 A1 | 5/2011 | Garcia Morchon et al. | |
| 2012/0144197 A1 | 6/2012 | Chung et al. | |
| 2012/0204032 A1 | 8/2012 | Wilkins et al. | |
| 2012/0324554 A1 | 12/2012 | Gomez et al. | |
| 2013/0166907 A1 | 6/2013 | Brown et al. | |
| 2014/0082353 A1 | 3/2014 | Everhart et al. | |
| 2014/0095867 A1 | 4/2014 | Smith et al. | |
| 2014/0095876 A1 | 4/2014 | Smith et al. | |
| 2014/0181892 A1 | 6/2014 | Von Bokern et al. | |
| 2014/0229735 A1 | 8/2014 | Holleis | |
| 2014/0281497 A1 | 9/2014 | Medvinsky et al. | |
| 2014/0281503 A1 | 9/2014 | Mills et al. | |
| 2014/0289528 A1 | 9/2014 | Baghdasaryan | |
| 2014/0337234 A1 | 11/2014 | Tang et al. | |
| 2014/0337632 A1 | 11/2014 | Kimura | |

OTHER PUBLICATIONS

Enhancing WLAN location privacy using mobile behavior. Horng et al. Expert Systems with Applications. (Year: 2011).*

Pushing the Limits of Address Based Authentication: How to Avoid MAC Address Spoofing in Wireless LANs. Bicakci et al. International Scholarly and Scientific Research and Innovation. (Year: 2008).*

Key Pre-distribution Scheme using Keyed-Hash Chain and Multipath Key Reinforcement for Wireless Sensor Networks. Hussain et al. IEEE. (Year: 2009).*

A Survey of RFID Authentication Protocols Based on Hash-Chain Method. Syamsuddin et al. IEEE. (Year: 2008).*

Lentz et al., "SDDR: Light-Weight, Secure Mobile Encounters", in the Proceedings of the 23rd USENIX conference on Security Symposium, Aug. 20, 2014, 16 pages.

Malkani et al., "Secure Device Pairing: A Usability Study", in the International Journal of UbiComp, vol. 3, No. 2, Apr. 2012, 16 pages.

"Final Office Action Issued in U.S. Appl. No. 14/640,538", dated Aug. 17, 2016, 9 Pages.

"Non Final Office Action Issued in U.S. Appl. No. 14/640,538", dated Nov. 30, 2016, 12 Pages.

"Non Final Office Action Issued in U.S. Appl. No. 14/640,538", dated Apr. 29, 2016, 12 Pages.

"Notice of Allowance Issued in U.S. Appl. No. 14/640,538", dated Apr. 18, 2017, 12 Pages.

"Non-final Office Action Issued in U.S Appl. No. 15/629,468", dated Feb. 22, 2018, 9 Pages.

Defrawy, et al., "PEUC-WiN: Privacy Enhancement by User Cooperation in Wireless Networks", In Proceedings of the 2nd IEEE Workshop on Secure Network Protocols, Nov. 12, 2006, pp. 38-43.

Fan, et al., "An Efficient Privacy-Preserving Scheme for Wireless Link Layer Security", In Proceedings of the IEEE GLOBECOM Global Telecommunications Conference, Nov. 30, 2008, pp. 1-5.

Hong, et al., "Secure Authentication in Virtual Community by Using Media Access Control Address (MAC)", In Security and Management, 2008, 5 Pages.

"International Preliminary Report on Patentability Issued in PCT Application No. PCT/US2015/050309", dated Jan. 4, 2017, 9 Pages.

"International Search Report and Written Opinion Issued in PCT Application No. PCT/US2015/050309", dated Feb. 12, 2016, 18 Pages.

"Second Written Opinion Issued in PCT Application No. PCT/US2015/050309", dated Jul. 4, 2016, 7 Pages.

"Non Final Office Action Issued in U.S. Appl. No. 15/629,468", dated Oct. 19, 2018, 8 Pages.

Cheng, et al., "Efficient Group Signatures From Bilinear Pairing", In Proceedings of International Conference on Information Security and Cryptology (CISC), Dec. 15, 2005, pp. 128-139.

Ellison, et al., "Public-Key Support for Group Collaboration", In Journal ACM Transactions on Information and System Security (TISSEC), vol. 6, Issue 4, Nov. 2003, pp. 547-565.

Hong, Sunghyuck, "Secure MAC Address-Based Authentication on X.509 v3 Certificate in Group Communication", In Journal of Korea Society for Internet Information, vol. 9, Issue 4, Aug. 2008, 5 Pages.

"Final Office Action Issued in U.S. Appl. No. 15/629,468", dated Jul. 27, 2018, 9 Pages.

"Office Action Issued in European Patent Application No. 15771838.8", dated Jul. 13, 2018, 8 Pages.

Alutoin, et al., "Personal Network Directory Service", In Journal of Telektronikk on Data and Telecommunications, vol. 103, No. 1, Mar. 2007, 8 Pages.

Palomar, et al., "Secure Content Access and Replication in Pure P2P Networks", In Computer Communications, vol. 31, No. 2, Feb. 5, 2008, pp. 266-279.

"Final Office Action Issued in U.S. Appl. No. 15/629,468", dated Feb. 15, 2019, 8 Pages.

* cited by examiner

ESTABLISHING TRUST BETWEEN TWO DEVICES

PRIORITY APPLICATIONS

This application is a divisional application of, and claims the benefit of priority to, U.S. Non-Provisional application Ser. No. 14/640,538 filed on Mar. 6, 2015, which claims the benefit of priority to U.S. Provisional Application No. 62/051,833, filed Sep. 17, 2014, the entire contents of which are incorporated herein by reference.

BACKGROUND

Typically, a computing device broadcasts a static media access control (MAC) address that allows other devices to discover and connect to the device via the broadcasted static MAC address. A MAC address comprises a unique identifier assigned to a network interface for communications on a physical network segment. For instance, a MAC address is used as a network address for Ethernet and Wi-Fi.

However, by broadcasting its static MAC address, a computing device becomes vulnerable to attacking or malicious entities (e.g., devices) to which the computing device does not want to connect. The attacking or malicious entities may exploit the static MAC address to forge connections, consume data from the device and, in various instances, even take control of the device. In an effort to combat these attacking or malicious entities, the computing device may be associated with a random MAC address and/or a static Universal MAC address. For instance, the pairing and discovery of devices may be initially implemented using the random MAC address, and after a connection is established, data communication may be implemented over the static Universal MAC address. While use of the random MAC address helps solve the problem of an attacking or malicious entity forging a connection with the computing device, the use of the random MAC address also prevents efficient (e.g., automatic) discovery between two computing devices. Furthermore, after a connection is established between two devices, attacking or malicious entities may expose a static Universal MAC address being used to communicate.

SUMMARY

This application describes enabling two devices that are part of a same domain to securely and/or automatically establish trust with, and connect to, one another. The two devices leverage a trusted entity by interacting with the trusted entity to obtain trust information that is used to securely and/or automatically establish trust with one another. The trusted entity may be tasked with managing the domain (e.g., an enterprise domain) and maintaining and sharing the trust information. For instance, the trust information may include a public key of an encryption key pair, a certificate signed by the trusted entity proving authenticity, and/or a hash function and a hash seed used to compute a series of results that form a hash chain. A device may use the trust information to discover another device, to connect to the other device and to dynamically change a MAC address being used to communicate with the other device.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, algorithms, components, modules, and/or technique(s) as permitted by the context above and throughout the document.

BRIEF DESCRIPTION OF DRAWINGS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

The techniques described herein leverage a trusted entity within a domain to enable devices that join the domain to establish trust with one another so they can securely discover each other and connect to one another. Trust may be established between devices if the devices have verified one another as authentic devices. In various examples discussed herein, a device is configured to provide trust information to, and/or receive trust information from, the trusted entity. The trust information may include, for example a public key of an encryption key pair, a certificate signed by the trusted entity proving authenticity, and/or a hash function and a hash seed used to compute a series of results that form a hash chain. The device may use the trust information to discover another device and to connect to the other device securely and automatically (e.g., with no user involvement or limited user involvement). Moreover, the device may use the trust information to dynamically change a MAC address being used to communicate with the other device.

In various implementations, the trusted entity may be associated with operation of a domain. Accordingly, the trusted entity may maintain and manage a list of devices that are approved to join the domain (e.g., devices registered to users such as employees of a company operating the domain in which the trusted entity is deployed). By leveraging the trusted entity, the techniques described herein implement a robust model that limits exposure to attacking and malicious entities and protects against attacks (e.g., Distributed Denial of Service (DDoS)) that leverage knowledge of an exposed or vulnerable MAC address of a device.

Figure 1:
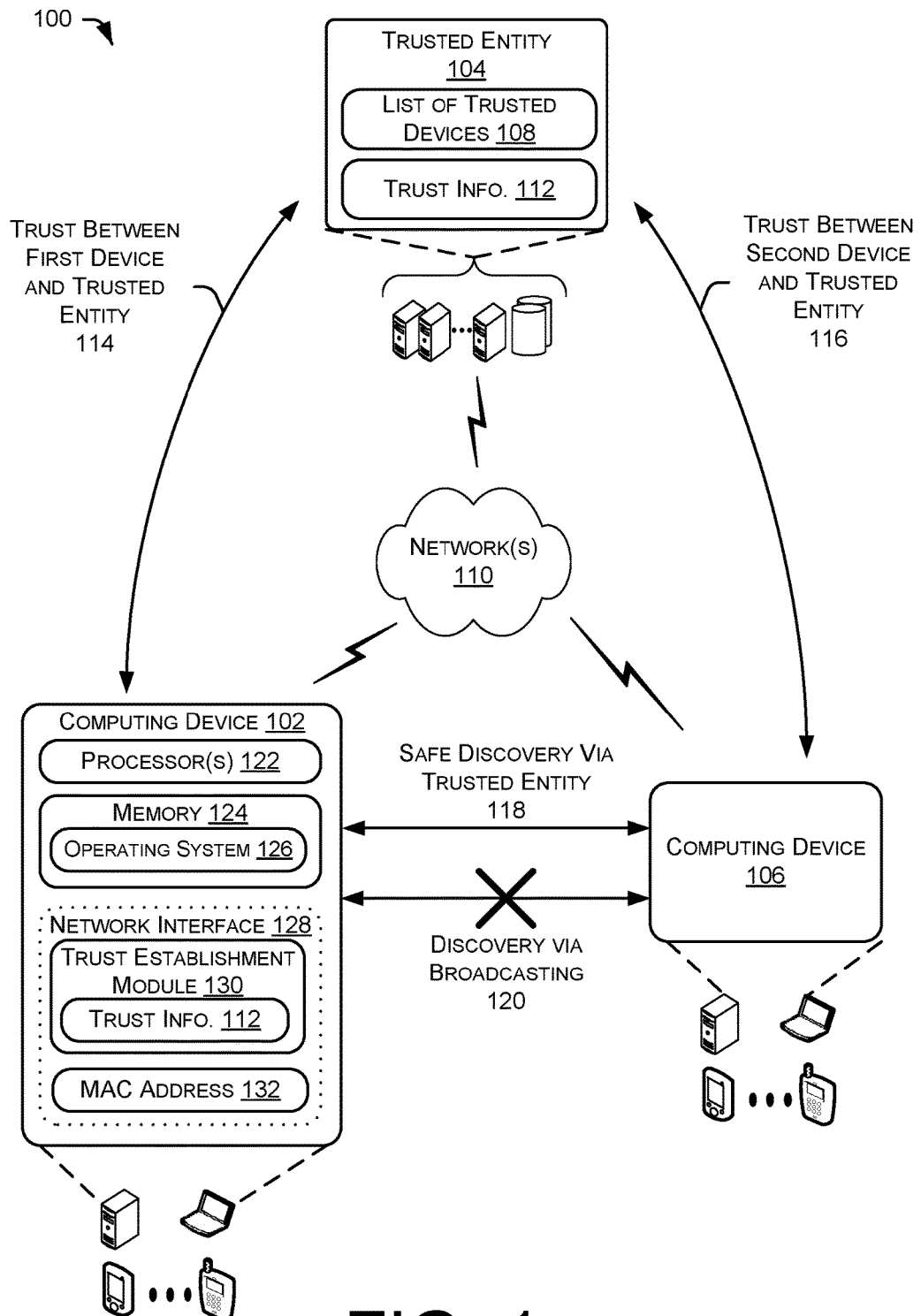
FIG. 1 illustrates an example environment in which a computing device interacts with a trusted entity to establish trust with another computing device that is joined, or part of, a same domain.

FIG. 1 illustrates an example environment 100 in which a computing device 102 interacts with a trusted entity 104 to establish trust with another computing device 106 that is joined to, or part of, a same domain. The trusted entity 102 maintains a list of trusted devices 108. A device listed in the list of trusted devices 108 is a device that is trusted within the domain, and therefore, is permitted to use the secure and/or automatic connection (e.g., pairing, bonding, etc.) techniques discussed herein. For instance, the domain may be an enterprise domain (e.g., a workplace domain) comprising network(s) 110 (e.g., secure networks), and the trusted entity 104 may comprise a centralized server and a centralized database that configures the list of trusted devices 108 that are known to the domain, and therefore, trusted within the domain. The term "centralized" is used herein to refer to the intermediate involvement of the trusted entity 104, which assists two devices included in the list of trusted devices 108 in establishing trust with one another for discovery, connection and/or communication purposes.

For example, the list of trusted devices 108 may be devices that are officially distributed to and registered to individual employees of a company (e.g., laptop computers, desktop computers, smartphones, smart watches, etc.) and/or devices that may not be registered to an individual employee but that are physically located throughout a workplace premises for use by a group of employees (e.g., conference room presentation devices, video teleconference devices, network devices, thermostat control devices, smart appliance devices, etc.). The list of trusted devices 108 may be configured by an administrative employee of a company that has the official capacity to update the list of trusted devices 108 (e.g., an IT coordinator that adds a new device to the list when a new employee is hired by the company and/or that removes a device from the list when an employee leaves the company). Accordingly, the list of trusted devices 108 includes devices that are approved and permitted to join the domain operated by the trusted entity 104.

The trusted entity 104 is configured to manage and store trust information 112. As further discussed herein, the trust information 112 may include, but is not limited to, cryptography keys, certificates, hash functions, hash seeds, a hash chain version number and so forth. In some examples, a computing device 102 in the list of trusted devices 108 generates the trust information 112 (e.g., an encryption key pair) and provides at least part of the trust information 112 (e.g., a public key) to the trusted entity 104. Therefore, the trusted entity 104 receives the trust information 112 from the computing device 102, stores the received trust information 112 and subsequently provides the stored trust information 112 generated by the computing device 102 to other computing devices on the list of trusted devices 108 so trust can be established between a pair of devices (e.g., computing device 102 and computing device 106). In some examples, the trusted entity 104 generates the trust information 112 itself (e.g., a certificate, a hash function, etc.) on behalf of the computing device 102, stores the generated trust information 112 and subsequently provides the stored trust information 112 to other computing devices on the list of trusted devices 108 so trust can be established between a pair of devices. Therefore, devices included in the list of trusted devices 108 of the domain can interact with the trusted entity 104 (e.g., provide trust information 112, receive trust information 112, etc.) to establish trust with, and connect to, other devices.

Consequently, FIG. 1 illustrates that, based on the known trust between the computing device 102 and the trusted entity 104 (as references by 114) and based on the known trust between the computing device 106 and the trusted entity 104 (as referenced by 116), the computing device 102 and the computing device 106 are able to safely discover and connect to one another by leveraging the mutual trust with the trusted entity 104 (as referenced by 118) and without having to use the conventional MAC address broadcasting approach that is vulnerable to exploitation by attacking and malicious entities (as referenced by 120, the "X" representing a cross out). The computing device 102 and the computing device 106 may connect and communicate using network(s) 110 or other connections (e.g., a Bluetooth connection).

While some of the examples provided herein are explained with respect to an enterprise domain, the techniques can also be implemented in non-enterprise domains. For instance, the techniques may be implemented in any domain that has a trusted entity or a trusted third party configured with a list of trusted devices, the trusted entity or the trusted third party being mutually trusted by a pair of devices on the list of trusted devices attempting to connect to one another.

A computing device (e.g., the computing device 102) configured to join, or be part of, a domain associated with the trusted entity 104, may include any one of a variety of devices, including portable devices or stationary devices. For instance, the computing device 102 may comprise a smart phone, a mobile phone, a personal digital assistant (PDA), an electronic book device, a wearable device (e.g., a smartwatch, electronic glasses, etc.), a laptop computer, a desktop computer, a tablet computer, a portable computer, a gaming console, a personal media player device, a work place device (e.g., a conference room presentation device, a video teleconference device, etc.), thermostat control devices, smart appliance devices, an image capture device, a server computer device or any other device.

Therefore, the computing device 102 may include one or more processors 122 and memory 124. The processor(s) 122 may be a single processing unit or a number of units, each of which could include multiple different processing units. The processor(s) 122 may include a microprocessor, a microcomputer, a microcontroller, a digital signal processor, a central processing unit (CPU), a graphics processing unit (GPU), etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) 122 may be configured to fetch and execute computer-readable instructions stored in the memory 124.

The memory 124 may include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PRAM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The memory 124 may include an operating system 126 configured to manage hardware and services within and coupled to the computing device 102 for the benefit of other components and other devices. For instance, other components of the computing device 102 may include user module(s) such as a browser or an application (e.g., an "app" configured on the computing device 102). As used herein, the term "module" is intended to represent example divisions of executable instructions for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules may be described herein as being implemented by software and/or firmware executable on a processor, in other embodiments, any or all of the modules may be implemented in whole or in part by hardware (e.g., a specialized processing unit, etc.) to execute the described functions.

The computing device 102 may also include a network interface 128 (e.g., a network interface controller or NIC). In various examples, the network interface 128 includes a trust establishment module 130. The trust establishment module 130 is configured to communicate, and exchange information (e.g., trust information 112), with the trusted entity 104, as further discussed herein. The trust establishment module 130 is also configured to discover and/or establish a connection with another computing device (e.g., computing device 106) using the trust information 112 and a MAC address 132. A MAC address 132 may be used in, or by, a media access control protocol sub-layer of an Open Systems Interconnection (OSI) model. A MAC address 132 may be stored in hardware of the network interface 128 (e.g., the read-only memory or some other firmware mechanism). In various examples, the trust information 112 represents the MAC address 132 as a network point that allows the computing device 106 to communicate with the computing device 102. Stated another way, the trust information 112 may be used to compute the MAC address 132 used by the computing device 102 to communicate with the computing device 106, and thus, no broadcast query that is vulnerable to be exploited by an attacking or malicious entity is needed.

While some of the examples provided herein are explained with respect to the trust establishment module 130 being included within the network interface 128, the trust establishment module 130 may also be implemented in other components of the computing device (e.g., a module on the memory 124 and/or the operating system 126).

Figure 2:
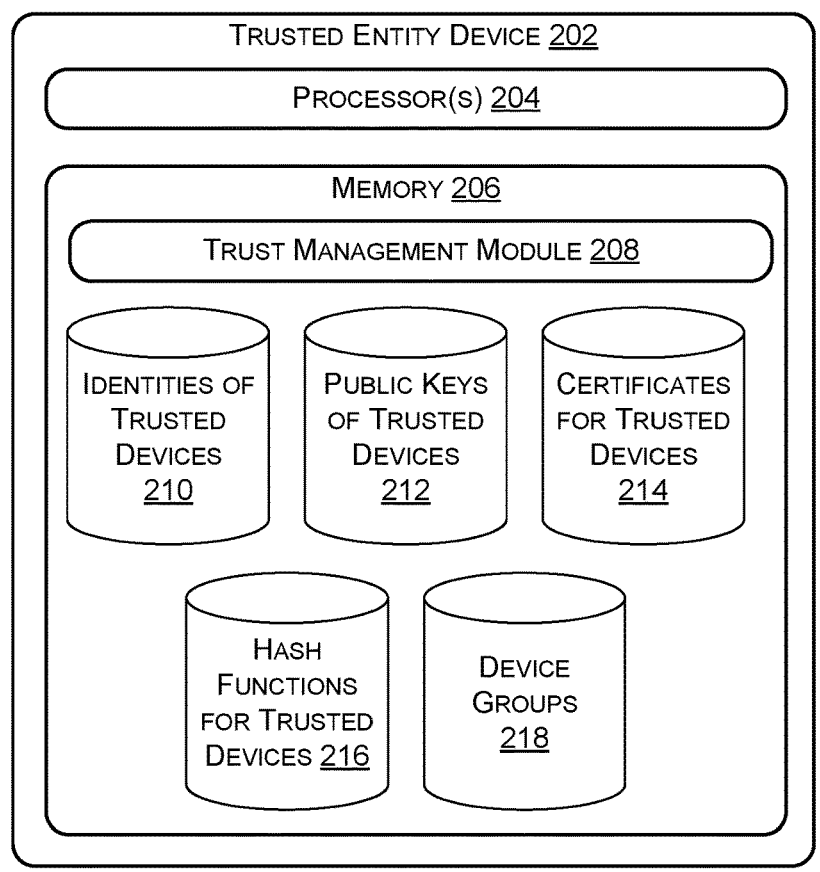
FIG. 2 illustrates a more detailed view of an example trusted entity device that manages, stores and provides trust information useable by devices to establish trust with one another.

FIG. 2 illustrates a detailed view 200 of an example trusted entity device 202 that may be part of, or operated by, the trusted entity 104. The trusted entity device 202 may include any one of a variety of devices, including portable devices or stationary devices. For instance, the trusted entity device 202 may comprise a server or another computing device that operates within a network service (e.g., a cloud service, a content provider, a service provider, a server farm, etc.). Accordingly, the trusted entity device 202 is configured to communicate with the devices on the list of trusted devices 108 (e.g., the computing device 102 and the computing device 106) via the network(s) 110, such as the Internet (e.g., a Wi-Fi connection) or other various communication technologies.

The trusted entity device 202 includes one or more processor(s) 204 and memory 206. Example types of processor(s) 204 and memory 206 are discussed above with respect to the processor(s) 122 and the memory 124 of FIG. 1. The memory 206 includes a trust management module 208. The trust management module 208 is configured to interact with devices in the trusted list of devices 108 so that two devices can establish trust and connect to one another. To this end, the trust management module 208 is configured to verify that devices are approved to join the domain (e.g., the devices are officially registered). For example, the trust management module 208 may access a database that includes identities of trusted devices 210 to verify that a device is trusted, and therefore, approved to join the domain. The trust management module 208 is also configured to receive trust information 112 from the devices that have joined the domain and, in some instances, generate trust information 112 on behalf of the devices and useable by the devices to establish trust with one another. Moreover, the trust management module 208 is configured to store the trust information 112 and provide the trust information 112 to other devices that have joined the domain so that the trust can be established.

In various examples further discussed herein (e.g., with respect to FIG. 3 and FIG. 4), the trust information 112 includes public keys of trusted devices. Therefore, the trust management module 208 may receive the public keys from the trusted devices and store the public keys in a public keys database 212.

In various examples further discussed herein (e.g., with respect to FIG. 5 and FIG. 6), the trust information 112 includes certificates to be generated and issued to trusted devices. Therefore, the trust management module 208 may generate the certificates and/or store the certificates in a certificates database 214.

In various examples further discussed herein (e.g., with respect to FIG. 7 and FIG. 8), the trust information 112 includes hash functions, hash seeds and hash chain version numbers to be issued to, and/or shared with, trusted devices. Therefore, the trust management module 208 may generate the hash functions and hash seeds and/or store the hash functions, the hash seeds and the hash chain version numbers in a hash functions database 216.

In further examples, the trust management module 208 may also create device associations and store device groups based on the associations in a device groups database 218. For instance, associations and groups may be created so that devices of the domain that are more likely to connect and communicate on a regular basis may be able to do so automatically and securely.

FIGS. 3-8 individually illustrate an example process for employing the techniques described herein. For ease of illustration, the example processes are described as being performed in the environment of FIG. 1 and/or FIG. 2. For example, one or more of the individual operations of the example processes may be performed by the computing device 102, by the trusted entity device 202, or by the computing device 106 with which the computing device 102 is establishing a connection. In the example processes of FIGS. 3-7, the respective operations performed by the respective devices are illustrated in a columnar format below the respective devices that perform the operations (e.g., as indicated at the top of FIGS. 3-7). However, processes may be performed in other environments and by other devices as well.

The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations may be omitted.

Figure 3:
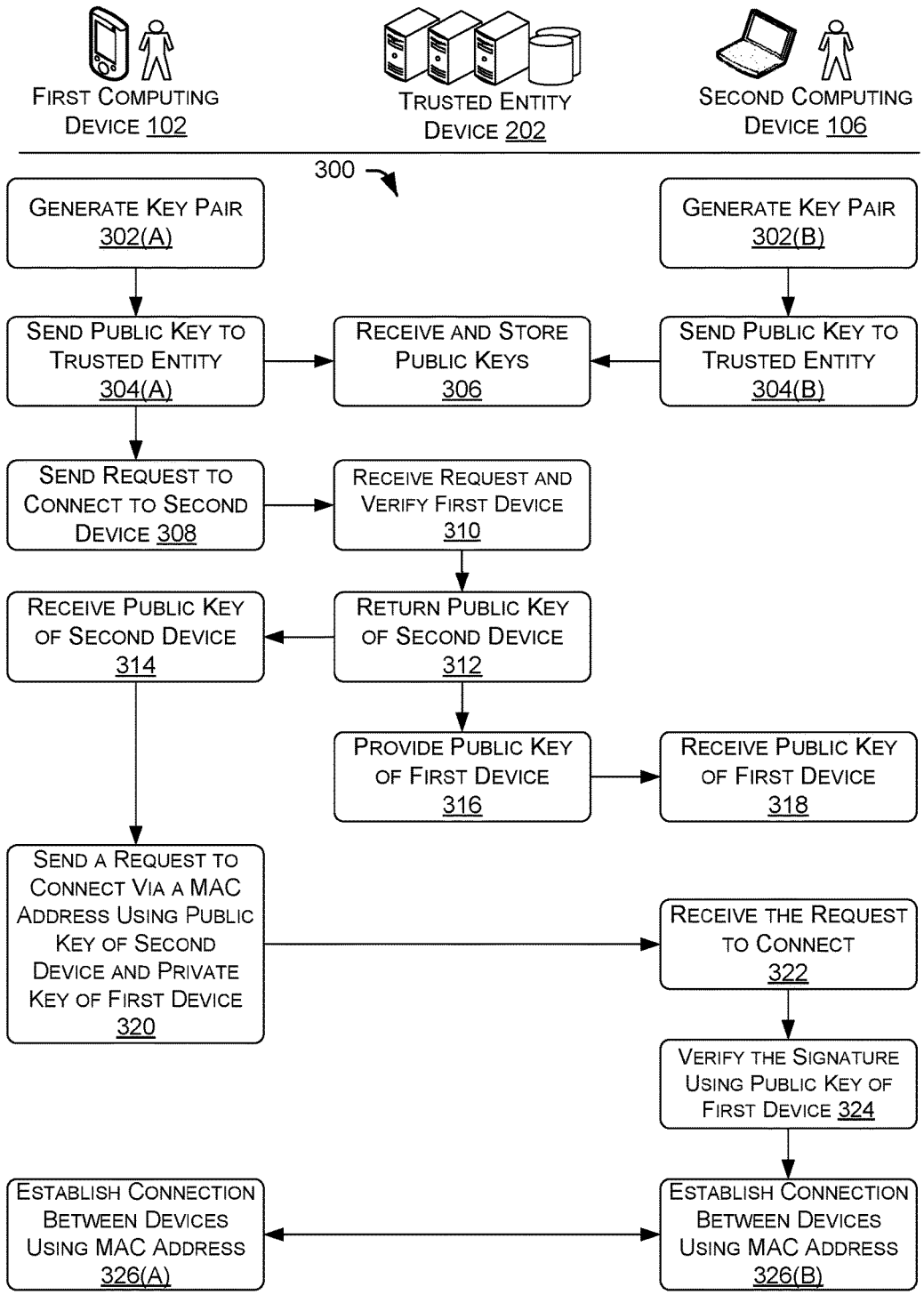
FIG. 3 illustrates an example process in which two computing devices that are mutually trusted by a trusted entity device are able to join a domain so that they can establish trust and connect to one another using public key cryptography.

FIG. 3 illustrates an example process 300 in which two computing devices (e.g., computing device 102 and computing device 106) that are mutually trusted by a trusted entity device 202 are able to join a domain so that they can establish trust and connect to one another. The example process 300 leverages public key cryptography to establish trust and/or enable devices to securely and automatically connect. An "automatic" connection of two devices may occur (i) without requiring input from the users of the devices or (i) with limited input from the users of the devices (e.g., a "limited" amount of input may refer to only requiring a user to select or identify a device to which the user wants to establish a connection).

At operation 302(A), the first computing device 102 generates, as trust information 112, an encryption key pair. In various examples, the encryption key pair includes a private key (e.g., "e_1") and a public key (e.g., "P_1"). The first computing device 102 retains the private key and uses the private key to sign (e.g., encrypt) information that can be decrypted by other devices (e.g., computing device 106) that have the public key, thereby proving to the other devices that the information was provided by the first computing device 102. Accordingly, the public key is configured to be provided to other devices (e.g., computing device 106 via trusted entity device 202 as further discussed herein). In a corresponding operation 302(B), the second computing device 106 generates, as its own trust information 112, an encryption key pair (e.g., "e_2", "P_2").

At operation 304(A), the first computing device 102 sends or provides the public key to the trusted entity device 202. For example, the first computing device 102 may generate the encryption key pair and/or provide the public key to the trusted entity device 202 in association with joining a domain and or authenticating to the domain (e.g., an employee arrives at a work premises). In a corresponding operation 304(B), the second computing device 106 sends or provides its own public key to the trusted entity device 202.

At operation 306, the trusted entity device 202 receives the public key from the first computing device 106 and receives the public key from the second computing device 106, and stores the public keys, e.g., in the public keys database 212.

At operation 308, the first computing device 102 sends, to the trusted entity device 202, a request to connect to the second computing device 106. For example, the request may be sent in association with the first computing device 102 discovering the second computing device 106 and wanting to connect to the second computing device 106, e.g., without having to broadcast its MAC address. The first computing device 102 may send the request to determine if the list of trusted devices 108 includes the second computing device 106. If so, the first computing device 102 may become aware that both the first computing device 102 and the second computing device 106 have mutual trust with the trusted entity device 202, and therefore, the mutual trust can be leveraged to establish trust between the two devices so that the two devices can securely and automatically discover each other and connect.

At operation 310, the trusted entity device 202 receives the request from the first computing device 102 and verifies that the first computing device 102 is a trusted device on the list of trusted devices 108 (e.g., via a stored device ID in the identities database 210).

At operation 312, the trusted entity device 202 returns, in response to the request, the public key of the second computing device 106 (e.g., "P_2") to the first computing device 102.

At operation 314, the first computing device 102 receives the public key of the second computing device 106 from the trusted entity device 202. In some instances, the first computing device 102 may implement a process to verify that the public key was received from the trusted entity device 202, and not another device.

At operation 316, the trusted entity device 202 provides, based on the request that identifies the second computing device 106, the public key of the first computing device 102 (e.g., "P_1") to the second computing device 106. For instance, the provision of the public key of the first computing device 102 may serve as, or be accompanied with, an indication that the first computing device 102 wants to establish trust and to connect with the second computing device 106.

At operation 318, the second computing device 106 receives the public key of the first computing device 102 from the trusted entity device 202. In some instances, the second computing device 106 may implement a process to verify that the public key was received from the trusted entity device 202, and not another device.

At operation 320, the first computing device 102 sends a request to connect via a MAC address 132 to the second computing device 106. The request and/or the MAC address 132 may be encrypted with the public key of the second device (e.g., "P_2") that the first computing device 102 received from the trusted entity device 202 (e.g., operation 314). Moreover, the request and/or the MAC address 132 may be signed using the private key (e.g., "e_1") of the first computing device 102 and retained by the computing device 102. Accordingly, the MAC address 132 is not broadcasted, and therefore, is not exposed for exploitation by attacking or malicious entities.

At operation 322, the second computing device 106 receives the request from the first computing device 102.

At operation 324, the second computing device 106 may verify the signature of the request and/or the MAC address using the public key of the first computing device 102 (e.g., "P_1") received from the trusted entity device 202 (e.g., operation 318). Moreover, the second computing device 106 may decrypt the request and/or the MAC address using its own private key (e.g., "e_2"). Accordingly, trust has been established between the two devices using trust information (e.g., public keys) provided via the trusted entity device 202.

At corresponding operations 326(A) and 326(B), the first computing device 102 and the second computing device 106 connect via the MAC address 132. The order of operations illustrated in FIG. 3 may vary from that shown. For example, the second computing device 106 may receive the public key of the first computing device 102 (e.g., operation 318) before the first computing device 102 receives the public key of the second computing device 106 (e.g., operation 314).

The example process 300 of FIG. 3 may be performed each time the computing device 102 and the computing device 106 want to connect.

Figure 4:
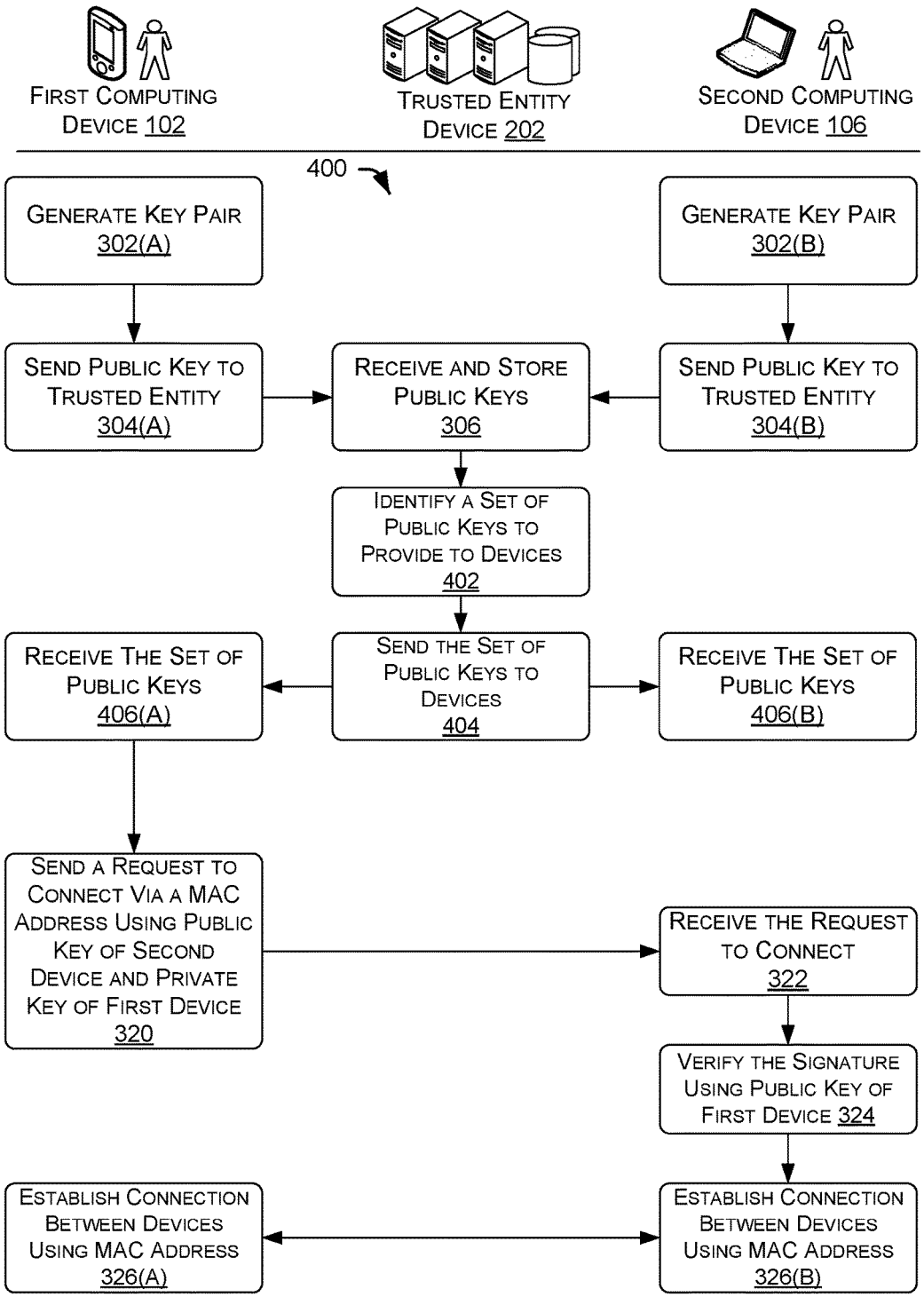
FIG. 4 illustrates an example process in which two computing devices that are mutually trusted by a trusted entity device are able to establish trust and connect to one another using a public key provided by the trusted entity device in advance. The example process of FIG. 4 is different from the example process of FIG. 3 in that, among other things, the trusted entity device provides, in advance, a set of public keys to a device so that the device does not have to contact the trusted entity device to retrieve a public key of another device each time the device wants to connect to the other device.

FIG. 4 illustrates another example process 400 in which two computing devices (e.g., computing device 102 and computing device 106) that are mutually trusted by a trusted entity device 202 are able to establish trust and connect to one another using a public key provided by the trusted entity device 102 in advance. As discussed herein, the example process 400 is different from the example process 300 of FIG. 3 in that the trusted entity device 202 provides, in advance, a set of public keys to a device so that the device does not have to contact the trusted entity device 202 to retrieve a public key of another device each time the device want to connect to the other device. Stated another way, a device may be able to persistently store, e.g., as trust information 112, a set of public keys respectively associated with a set of other devices so that the device does not have to continue to go back to the trusted entity device 202 to retrieve a public key each time it wants to connect. Rather, when the device wants to connect to the other device, the other device's public key is already stored locally and is readily available to use.

In some examples, the provision of the set of public keys in advance may be based on defined groups of devices, e.g., as stored in the device groups database 218. The groups may be defined and created by a qualified person (e.g., an IT coordinator, a project manager, etc.) and/or in accordance with defined policies. In at least one example, the set of public keys that are provided, or pushed, to a device may be respectively associated with a set of other devices that are owned or controlled by the same user, or associated with a same user account. For instance, an individual employee of a company may have multiple devices that he or she uses for work-related tasks (e.g., a smartphone, a tablet device, a laptop computer and a desktop computer at a home office), each of which are devices in the list of trusted devices 108 that are able to join (e.g., log on to), or be part of, an enterprise domain operated by the company. In some instances, the enterprise domain may be hosted or operated by an external entity to serve the company (e.g., configured for use by the company). In another example, the set of public keys that are provided to a device may be respectively associated with a set of other devices that belong to various employees on a particular team or of a particular work project group. In yet another example, the set of public keys that are provided to a device may be respectively associated with a set of other devices that are typically within a predetermined vicinity of the device (e.g., each work premises device that is set up on a particular floor or within a particular building of employment where an employee is typically located).

In FIG. 4, operations 302(A), 302(B), 304(A), 304(B), and 306 are the same or similar to those discussed above with respect to FIG. 3.

However, at operation 402 after the computing device 102 and the computing device 106 have joined the domain, have authenticated to the domain, and/or have provided their public keys, the trusted entity device 202 identifies a set of public keys to provide to each of the first computing device 102 and the second computing device 106. In some examples, the set of public keys identified may be the same for the first computing device 102 and the second computing device 106, while in other examples, the set of public keys identified may be different for the first computing device 102 and the second computing device 106. As used herein, a "set" may include one or multiple (e.g., one public key, two public keys, five public keys, ten public keys, and so forth).

At operation 404, the trusted entity device 202 sends the sets of public keys to the respective devices, e.g., the first computing device 102 and the second computing device 106. As discussed, in one particular example, the public keys provided by the trusted entity device 202 include the public keys for a set of devices that are associated with an individual user (e.g., owned by the individual user, registered to the individual user, controlled by the individual user, etc.). The sending of a set of public keys by the trusted entity device 202 may be referred to as a "push" of the trust information 112. Stated another way, the trusted entity device 202 may automatically push the set of public keys to a computing device before, and/or independent of, receiving a specific request for a public key and/or a specific request to connect to another specific device.

At operation 406(A), the first computing device 102 receives the set of public keys provided by the trusted entity device 202. In a corresponding operation 406(B), the second computing device 106 receives the set of public keys provided by the trusted entity device 202.

Now that the first computing device 102 has the public key (e.g., "P_2") of the second computing device 106, e.g., stored locally, it may implement operation 320 in a same or similar way to that discussed above with respect to FIG. 3. For example, the first computing device 102 sends the request to connect via the MAC address 132 to the second computing device 106. The request and/or the MAC address 132 may be encrypted with the public key of the second device 106 that the first computing device 102 received from the trusted entity device 202 (e.g., operation 406(A)). Moreover, the request and/or the MAC address 132 may be signed using the private key (e.g., "e_1") of the first computing device 102. Accordingly, the MAC address 132 is not broadcasted, and therefore, is not exposed for exploitation by attacking or malicious entities.

Furthermore, the second computing device 106 may implement operations 322 and 324 in a same or similar way to that discussed above with respect to FIG. 3. For example, the second computing device 106 may verify the signature of the request and/or the MAC address using the public key of the first computing device 102 (e.g., "P_1") received from the trusted entity device 202 (e.g., operation 406(B)). Moreover, the second computing device 106 may decrypt the request and/or the MAC address using its own private key (e.g., "e_2"). Accordingly, trust has been established between the two devices using trust information (e.g., public keys) provided via the trusted entity device 202.

Consequently, the first computing device 102 and the second computing device 106 may respectively implement corresponding operations 326(A) and 326(B) (e.g., similar or the same to those discussed above with respect to FIG. 3) and connect via the MAC address 132. The order of operations illustrated in FIG. 4 may vary from that shown.

In one example implementation, two devices (e.g., a smartphone and a laptop) that have previously received and stored public keys and that belong to a user may establish trust and/or may connect via operations 320, 322, 324, 326(A) and 326(B) using a short-range connection (e.g., a Bluetooth connection while the user is working from home) without having to be connected to a network that is part of the domain and/or without having to contact the trusted entity device 202 to retrieve a public key.

In some instances, as new devices join the domain and are registered with the trusted entity device 202 over time (e.g., added to the list of trusted devices 108), the trusted entity device 202 may add the new devices to appropriate groups of devices and push or distribute their public keys to other trusted devices that are part of the same group so that the other trusted devices in the group may be updated with the public key information related to the new devices that join the domain (e.g., devices that belong to the same user). In one example, a group of devices may include all the devices trusted by the trusted entity device 202 within the domain. In another example, a size of a group may be limited to a threshold size (e.g., five devices, ten devices, twenty devices, fifty devices, etc.) to help ensure security in case a device is compromised. That is, it may be more efficient for the trusted entity device 202 to resolve issues (e.g., revoke/cancel compromised keys, receive and distribute new uncompromised keys, etc.) within the domain if a compromised device contains five public keys compared to if a compromised device contains fifty public keys. In yet another example, a size of a group may be limited to a threshold size based on a consideration of resource consumption at a device (e.g., the storage resources used to locally store five public keys compared to locally storing one hundred public keys).

Figure 5:
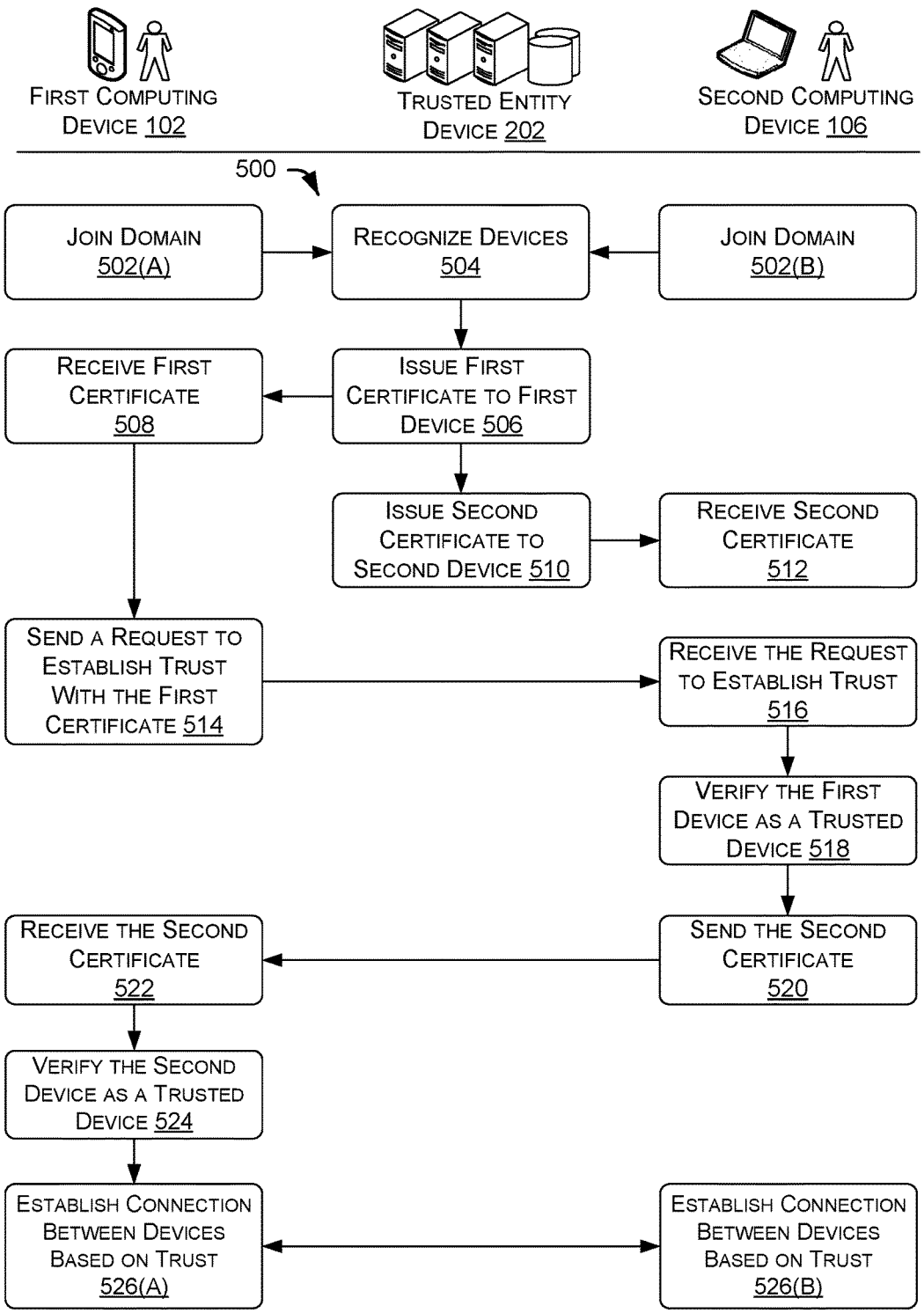
FIG. 5 illustrates an example process in which two computing devices that are mutually trusted by a trusted entity device are able to establish trust and connect to one another using certificates.

FIG. 5 illustrates yet another example process 500 in which two computing devices (e.g., computing device 102 and computing device 106) that are mutually trusted by a trusted entity device 202 are able to establish trust and connect to one another. The example process 500 uses certificates to establish trust. A certificate may be referred to as a token of trust that is used to verify authenticity through a chain. For example, a certificate may be signed and issued by the trusted entity device 202 to the first computing device 102, and the certificate may be used by the first computing device 102 to indicate that it is trusted by the trusted entity device 202. Consequently, the second computing device 106 may determine that the first computing device 102 deserves to be trusted based on the certificate. Stated another way, trust is established indirectly through a chain that proves authenticity of a device.

At operation 502(A), the first computing device 102 joins a domain associated with (e.g., operated by) the trusted entity device 202. In a corresponding operation 502(B), the second computing device 106 also joins the domain.

At operation 504, the trusted computing device 202 recognizes the devices and verifies that they are trusted devices included on the list of trusted devices 108, e.g., via accessing the device identities database 210.

At operation 506, the trusted entity device 202 issues a first certificate to the first computing device 102. As discussed above, the trusted entity device 202 may sign the first certificate thereby providing an indication that the first computing device 102 is trusted by the trusted entity device 202.

At operation 508, the first computing device 102 receives the first certificate from the trusted entity device 202.

At operation 510, the trusted entity device 202 issues a second certificate to the second computing device 106. Again, the trusted entity device 202 may sign the second certificate thereby providing an indication that the second computing device 106 is trusted by the trusted entity device 202.

At operation 512, the second computing device 106 receives the second certificate from the trusted entity device 202.

At operation 514, the first computing device 102 sends a request to establish trust to the second computing device 106. The request to establish trust may include, or in some way be associated with, the first certificate.

At operation 516, the second computing device 106 receives the request to establish trust from the first computing device 102.

At operation 518, the second computing device 106 verifies, using the first certificate, that the first computing device 102 is a trusted computing device. As discussed above, the first certificate is issued to the first computing device 102 by the trusted entity device 202 and is received at the second computing device 106 from the first computing device 102. Thus, the first certificate is used to prove authenticity of the first computing device 102 via a chain of trust.

At operation 520, the second computing device 106 sends the second certificate to the first computing device 102.

At operation 522, the first computing device 102 receives the second certificate from the second computing device 106.

At operation 524, the first computing device 102 verifies, using the second certificate issued, that the second computing device 106 is a trusted computing device.

At corresponding operations 526(A) and 526(B), the first computing device 102 and the second computing device 106 establish a connection based on mutual trust established via the exchanged certificates.

In various examples, certificates may be used to establish trust instead of public key cryptography, e.g., as discussed above with respect to FIG. 3 or FIG. 4. In other examples, the public key cryptography of FIG. 3 or FIG. 4 may be used in addition to the certificates described with respect to FIG. 5. For instance, the request to establish trust sent from the first computing device 102 to the second computing device 106 (e.g., operation 514) may be encrypted with the public key of the second computing device 106 (e.g., "P_2") that the first computing device 102 has previously received from the trusted entity device 202. Moreover, the request may be signed using the private key (e.g., "e_1") of the first computing device 102.

The order of operations illustrated in FIG. 5 may vary from that shown. For example, the second computing device 106 may receive the second certificate (e.g., operation 512) before the first computing device 102 receives the first certificate (e.g., operation 508).

Figure 6:
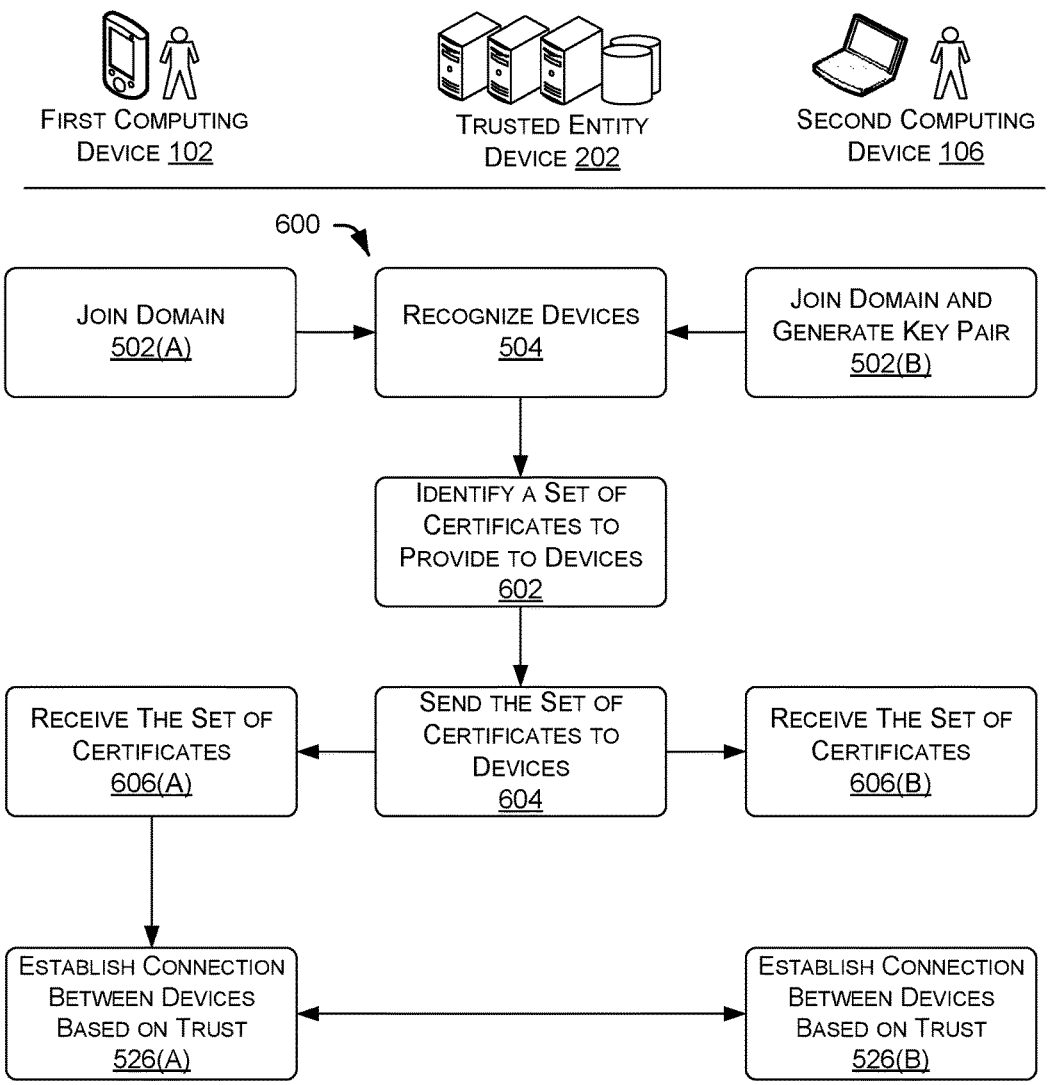
FIG. 6 illustrates an example process in which two computing devices that are mutually trusted by a trusted entity device are able to establish trust and connect to one another using certificates provided by the trusted entity device in advance. The example process of FIG. 6 is different from the example process of FIG. 5 in that, among other things, the trusted entity device provides, in advance, a set of certificates to a device so that the device itself does not have to send its own certificate to another device.

FIG. 6 illustrates another example process 600 in which two computing devices (e.g., computing device 102 and computing device 106) that are mutually trusted by a trusted entity device 202 are able to establish trust and connect to one another using certificates provided by the trusted entity device 102 in advance. The example process 600 is different from the example process 500 of FIG. 5 in that the trusted entity device 202 provides, in advance, a set of certificates to a device so that the device itself does not have to provide its certificate issued by the trusted entity device 202. Stated another way, a device may be able to persistently store, e.g., as trust information 112, a set of certificates respectively issued to, or associated with, a set of other devices.

In some examples, the provision of the set of certificates in advance may be based on defined groups of devices, e.g., as stored in the device groups database 218 and as discussed above with respect to FIG. 4.

In FIG. 6, operations 502(A), 502(B), and 504 are the same or similar to those discussed above with respect to FIG. 5.

However, at operation 602 after the computing device 102 and the computing device 106 have joined the domain, the trusted entity device 202 identifies a set of certificates to provide to each of the first computing device 102 and the second computing device 106. In some examples, the set of certificates identified may be the same for the first computing device 102 and the second computing device 106, while in other examples, the set of certificates identified may be different for the first computing device 102 and the second computing device 106.

At operation 604, the trusted entity device 202 sends the sets of certificates to the respective devices, e.g., the first computing device 102 and the second computing device 106. As discussed, in one particular example, the certificates provided by the trusted entity device 202 include the certificates for a set of devices that are associated with an individual user (e.g., owned by the individual user, registered to the individual user, controlled by the individual user, etc.).

At operation 606(A), the first computing device 102 receives the set of certificates provided by the trusted entity device 202. In a corresponding operation 606(B), the second computing device 106 receives the set of certificates provided by the trusted entity device 202.

Now that the first computing device 102 has the certificate issued by the trusted entity device 202 to, and/or on behalf of, the second computing device 106 and now that the second computing device 106 has the certificate issued by the trusted entity device 202 to, and/or on behalf of, the first computing device 102, operations 526(A) and 526(B) may be implemented in a same or similar way to that discussed above with respect to FIG. 5. For example, a connection may be established based on mutual trust established via the certificates received in advance from the trusted entity device 202. Consequently, the devices do not need to send their certificates to one another, but rather the devices can securely and automatically connect based on information received in advance from the trusted entity device 202. The order of operations illustrated in FIG. 6 may vary from that shown.

In at least one example, a certificate issued by the trusted entity device 202 may be a public key certificate (e.g., also referred to as a digital certificate or identity certificate) that is used to prove ownership of a public key. The certificate may include information about the public key, information about the identity of the owner of the public key, and the digital signature of an entity that has verified that the certificate's contents are correct. If the signature is valid, and a device examining or verifying the certificate trusts the signer, then the device can establish trust with the owner of the public key and can use the public key to communicate with the owner (e.g., another device).

By using the certificates described in FIG. 5 and/or FIG. 6, trust can be established between two devices before a MAC address is used to connect (e.g., before sharing the MAC address to pair devices). Moreover, the trusted entity device 202 can revoke a certificate when a device is no longer included on the list of trusted devices 108, and therefore, the device will no longer be trusted by other devices. A device may be removed from the list of trusted devices, for example, when an employee leaves a company or is fired by the company.

As discussed above, conventional pairing and discovery of devices may be initially implemented using a random MAC address, and after a connection is established, data communication may be implemented over a static Universal MAC address. However, attacking and malicious entities may still be able to first attack and compromise one device to determine the static Universal MAC address being used by its paired or partnered device, and thus, the attacking and malicious entities may launch a second attack on the paired or partnered device after the static Universal MAC address is exposed via the first attack.

Figure 7:
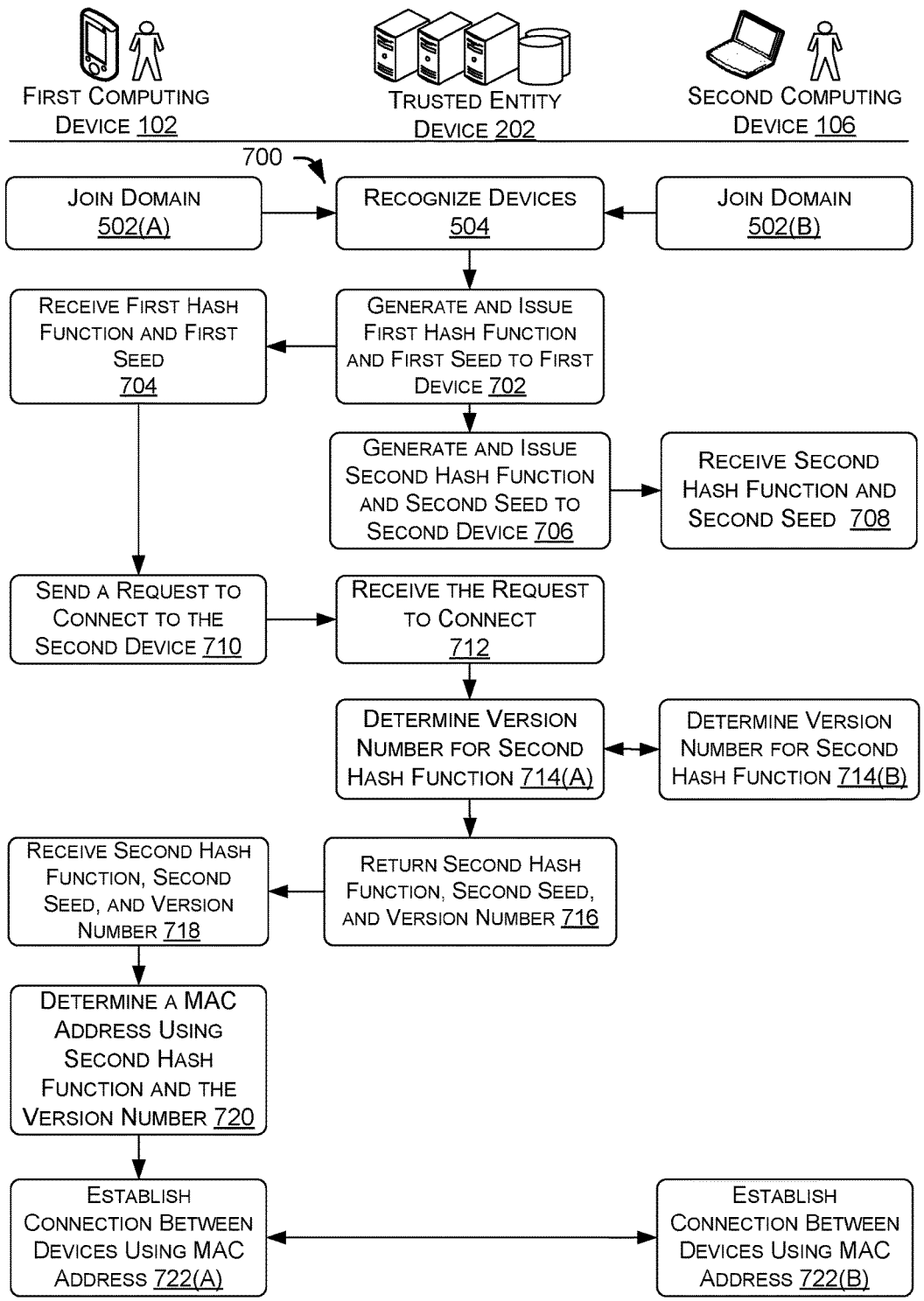
FIG. 7 illustrates an example process that uses a hash function to determine a MAC address to use for communications.

FIG. 7 illustrates an example process 700 that uses a hash function to determine or compute a MAC address to use for communications. The hash function may be used to continually change the MAC address, thereby allowing two devices to securely connect and communicate while reducing or eliminating exposure to attacking or malicious entities (e.g., reduce the likelihood of a malicious attack). Stated another way, a device may use the hash function to dynamically compute a random MAC address. In various examples, the process 700 may be implemented in accordance with establishing trust between two devices, as described above with respect to any one of FIGS. 3-6.

In various examples, a hash function is a one way operation that inputs data and outputs a result (e.g., output data, output value, etc.). However, given the result and the hash function, it is impossible to know or compute the data that was input into the hash function. Accordingly, data can be input into the hash function to output a first result. The first result may then be input to the hash function to output a second result. The second result may then be input to the hash function to output a third result and so forth. This may be repeated hundreds, thousands or even millions of times to create a hash chain, or a chain of computed results. As described herein with respect to FIG. 7, the hash chain may be used to dynamically manage and change a MAC address being used by a device.

In FIG. 7, operations 502(A), 502(B), and 504 are the same or similar to those discussed above with respect to FIG. 5.

At 702, the trusted entity device 202 generates and issues a first hash function and a first seed (e.g., "H_1") to the first computing device 102. The first seed may be data that is initially input to the first hash function to generate a hash chain.

At 704, the first computing device 102 receives the first hash function and the first seed for the first hash function.

Subsequently, the first computing device 102 and/or the trusted entity device 202 may generate a first hash chain using the first hash function and the first seed and/or share the first hash chain between one another.

At 706, the trusted entity device 202 generates and issues a second hash function and a second seed (e.g., "H_2") to the second computing device 106.

At 708, the second computing device 106 receives the second hash function and the second seed for the second hash function. Subsequently, the second computing device 106 and/or the trusted entity device 202 may generate a second hash chain using the second hash function and the second seed and/or share the second hash chain between one another.

At 710, the first computing device 102 sends, to the trusted entity device 202, a request to connect to the second computing device 106.

At 712, the trusted entity device 202 receives the request to connect.

At 714(A) and/or 714(B), the trusted entity device 202 and/or the second computing device 106 determine a version number of the second hash chain that can be used to share a current MAC address being used by the second computing device 106. The version number may refer to a result in the hash chain (e.g., a location within the hash chain such as the first computed result, the second computed result, the third computed result, and so forth). The version number or the result may represent, or be associated with, a MAC address being used by the second computing device 106.

At 716, the trusted entity device 202 returns the second hash function, the second seed, and the determined version number of the second hash chain to the first computing device 102.

At 718, the first computing device 102 receives the second hash function, the second seed, and the determined version number of the second hash chain.

At 720, the first computing device 102 determines a MAC address using the second hash function, the second seed, and the determined version number of the second hash chain. For instance, if the version number indicates the second computing device 106 is currently using a MAC address associated with the third version (e.g., the third computed result) of the second hash chain, then the first computing device 102 is configured to: input the second seed data into the second hash function to compute a first result (e.g., the first version), input the computed first result into the second hash function to compute a second result (e.g., the second version), and input the computed second result into the second hash function to compute a third result. The computed third result corresponds to the third version and may be used to determine the MAC address being used by the second computing device 106 to communicate.

At corresponding operations 722(A) and 722(B), the first computing device 102 and the second computing device 106 establish a connection using the determined MAC address of the second computing device 106. Additionally, similar operations may be performed to determine a version number of the first hash chain which may be provided to, and used by, the second computing device 106 to determine a current MAC address used by the first computing device 102.

Thus, according to FIG. 7, a device that wants to connect to another device can request, from the trusted entity device 202, a hash function, a hash seed and a version number usable to compute a dynamically changing and randomized MAC address being used by the other device.

In various examples, the example process 700 of FIG. 7 may be implemented in accordance with any one of the example processes in FIGS. 3-6. For example, a device may use public key cryptography and/or a certificate to verify another device and/or to secure a connection request sent to the other device. Accordingly, the example scenario of FIG. 5 allows two devices that are trusted within the domain to maintain a connection through a random MAC address. Moreover, the devices can move from one version of the hash chain to another version of the hash chain at any time thereby preventing or stopping compromises that may have leaked the current random MAC address. The moving may be implemented without the devices having to complete discovery and/or pairing again. Moreover, if trust in a device is revoked by the trusted entity device 202, the hash seed can be changed and the device may no longer have the necessary information to connect to other trusted devices.

Figure 8:
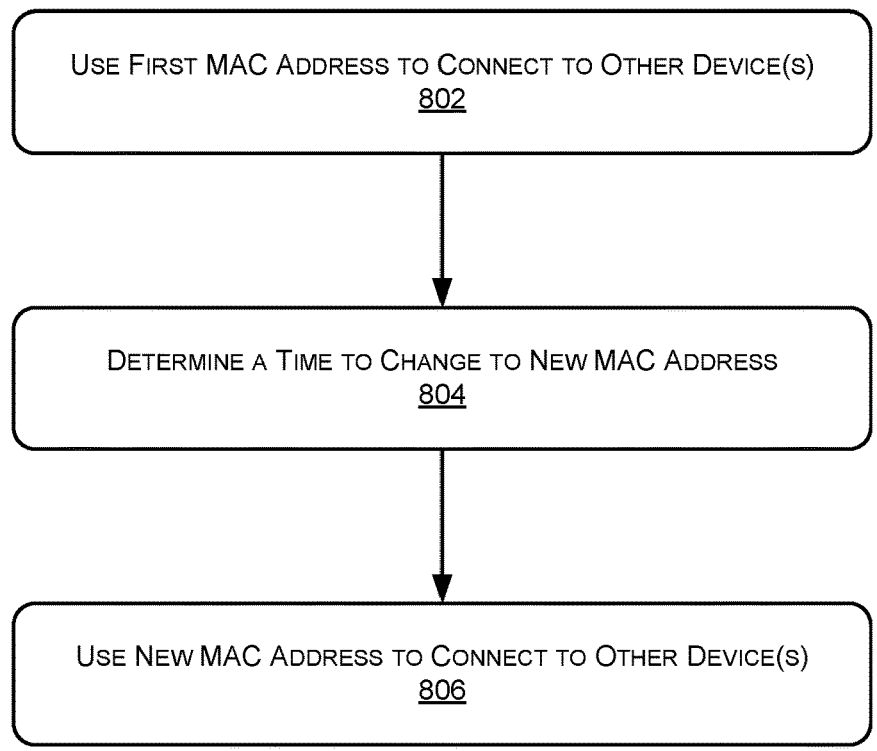
FIG. 8 illustrates an example process that uses a hash function to dynamically change a MAC address used by a device for communications.

FIG. 8 illustrates an example process 800 that uses a hash function to dynamically change a MAC address used by a device. For instance, a hash chain may be generated using the hash function and different versions (e.g., computed results) within the hash chain may be used to implement a "rolling" MAC address that dynamically changes based on a move from one version of the hash chain to the next, thereby enabling trusted devices to communicate with each other while protecting devices from attacking and malicious entities that do not have access to the hash function or hash chain.

At 802, a device (e.g., the first computing device 102) uses a first MAC address to connect to other devices (e.g., the second computing device 106).

At 804, the device determines that it is time to change to a new MAC address that is different than the first MAC address (e.g., move to a next version in the hash chain). In one example, the timing protocol used to determine a time to change may be determined automatically by the hash function (e.g., periodic timing, variable timing that is unpredictable to attacking and malicious entities, etc.). In another example, the device may determine that it is time to change based on a particular event or trigger (e.g., an indication that a currently used MAC address has been compromised). The device may then report its intention to change MAC addresses to the trusted entity device 202 so that the trusted entity device 202 can disseminate instructions to other trusted devices (e.g., to move from one version number to the next). Or, the device may report its intention to change MAC addresses directly to a paired device.

At 806, the device uses the new MAC address to connect to the other device(s).

Accordingly, by implementing the example processes of FIG. 7 and FIG. 8, even a compromised device can limit the extent of an attack by dynamically changing a MAC address based on a hash chain. Consequently, a device that does not know the hash function and the hash seed used to compute a new or an updated MAC address cannot connect to the device.

EXAMPLE CLAUSES

Example A, a device comprising: a processing system comprising: one or more processors; and memory coupled to the one or more processors, the processing system configured to: send a first public key associated with the device to a trusted entity device, the trusted entity device maintaining a list of devices that are trusted within a domain, the list of devices including the device; receive a second public key from the trusted entity device, the second public key associated with another device included in the list of devices; send, to the another device, a request to connect via a media access control (MAC) address, the request to connect encrypted with the second public key and signed with a private key that is associated with the device; and establish a connection with the another device in response to the another device using the first public key to verify the request to connect via the MAC address, the first public key having been provided to the another device by the trusted entity device.

Example B, the device of Example A, wherein the receiving the second public key from the trusted entity device and the encryption of the request to connect using the second public key enables the device and the another device to securely connect via the MAC address without the device having to broadcast the MAC address.

Example C, the device of Example A or Example B, wherein the processing system is further configured to send, to the trusted entity device and prior to receiving the second public key, a specific request to connect to the another device.

Example D, the device of Example A or Example B, wherein the second public key is received as part of a set of public keys respectively associated with a set of devices on the list of trusted devices, the device and the set of devices being included in a defined group of devices approved for automatic pairing.

Example E, the device Example D, wherein the device and the set of devices are associated with a same user account.

Example F, the device of Example D or Example E, wherein the set of public keys is received at the device and from the trusted entity device in response to the device joining the domain, and independent of the device sending, to the trusted entity device, a specific request to connect to the another device.

Example G, the device of any one of Example A through Example F, wherein the processing system is further configured to generate a key pair that includes the first public key and the private key.

Example H, the device of any one of Example A through Example G, wherein the domain comprises an enterprise domain and the list of devices includes devices registered to employees of a company that is served by the enterprise domain.

While Example A through Example H are described above with respect to a device, it is understood in the context of this document that the content of Example A through Example H may also be implemented via a system, computer storage media, and/or a method.

Example I, a device comprising: a processing system comprising: one or more processors; and memory coupled to the one or more processors, the processing system configured to: receive a certificate from a trusted entity device, the trusted entity device maintaining a list of devices that are trusted within a domain, and the list of devices including the device; and establish, based at least in part on the certificate, a connection with another device via a media access control (MAC) address.

Example J, the device of Example I, wherein the receiving the certificate from the trusted entity device enables the device and the another device to securely connect via the MAC address without the device having to broadcast the MAC address.

Example K, the device of Example J or Example I, wherein the certificate indicates that the device is trusted by the trusted entity device, and the processing system is further configured to cause the device to send the certificate to the another device prior to establishing the connection to enable the another device to verify that the device is trusted by the trusted entity device.

Example L, the device of Example K, wherein the certificate is received at the device and from the trusted entity device in response to the device joining the domain, and independent of the device sending, to the trusted entity device, a specific request to connect to the another device.

Example M, the device of Example J or Example I, wherein the certificate indicates that the another device is trusted by the trusted entity device and the certificate is received as part of a set of certificates respectively associated with a set of devices on the list of trusted devices, the device and the set of devices being included in a defined group of devices approved for automatic pairing.

Example N, the device of Example M, wherein the certificate is received at the device and from the trusted entity device in response to the device joining the domain, and independent of the device sending, to the trusted entity device, a specific request to connect to the another device.

Example O, the device of Example M, wherein the device and the set of devices are associated with a same user account.

Example P, the device of any one of Example I through Example O, wherein the domain comprises an enterprise domain and the list of devices includes devices registered to employees of a company that is served by the enterprise domain.

While Example I through Example P are described above with respect to a device, it is understood in the context of this document that the content of Example I through Example P may also be implemented via a system, computer storage media, and/or a method.

Example Q, a device comprising: a processing system comprising: one or more processors; and memory coupled to the one or more processors, the processing system configured to: issue a hash function and a hash seed to a first device, the hash seed and the hash function usable to generate a hash chain that includes multiple versions; receive, from a second device, a request to connect to the first device; determine a current version of the multiple versions of the hash chain that is being used by the first device to determine a media access control (MAC) address; and send, to the second device, the hash function, the hash seed and the current version thereby enabling the second device to determine the MAC address and connect to the first device via the MAC address.

Example R, the device of Example Q, wherein the processing system is further configured to: receive, from the first device, an indication that the first device is changing from using the MAC address to using a new MAC address associated with a new version of the multiple versions of the hash chain; and provide the indication to the second device.

Example S, the method of Example R, wherein the indication is received based at least in part on a timing protocol associated with the hash function and usable to determine a time to change the MAC address.

Example T, the method of Example R, wherein the indication is received based at least in part on a determination that the MAC address has been compromised.

While Example Q through Example T are described above with respect to a device, it is understood in the context of this document that the content of Example Q through Example T may also be implemented via a system, computer storage media, a security device, and/or a method.

Example U, a system comprising: means for sending a first public key associated with the device to a trusted entity device, the trusted entity device maintaining a list of devices that are trusted within a domain, the list of devices including the device; means for receiving a second public key from the trusted entity device, the second public key associated with another device included in the list of devices; means for sending, to the another device, a request to connect via a media access control (MAC) address, the request to connect encrypted with the second public key and signed with a private key that is associated with the device; and means for a connection with the another device in response to the another device using the first public key to verify the request to connect via the MAC address, the first public key having been provided to the another device by the trusted entity device.

Example V, the system of Example U, wherein the receiving the second public key from the trusted entity device and the encryption of the request to connect using the second public key enables the device and the another device to securely connect via the MAC address without the device having to broadcast the MAC address.

Example W, the system of Example U or Example V, further comprising means for sending, to the trusted entity device and prior to receiving the second public key, a specific request to connect to the another device.

Example X, the system of Example U or Example V, wherein the second public key is received as part of a set of public keys respectively associated with a set of devices on the list of trusted devices, the device and the set of devices being included in a defined group of devices approved for automatic pairing.

Example Y, the system Example X, wherein the device and the set of devices are associated with a same user account.

Example Z, the system of Example X or Example Y, wherein the set of public keys is received at the device and from the trusted entity device in response to the device joining the domain, and independent of the device sending, to the trusted entity device, a specific request to connect to the another device.

Example AA, the system of any one of Example U through Example A, further comprising means for generating a key pair that includes the first public key and the private key.

Example BB, the system of any one of Example U through Example AA, wherein the domain comprises an enterprise domain and the list of devices includes devices registered to employees of a company that is served by the enterprise domain.

Example CC, a system comprising: means for receiving a certificate from a trusted entity device, the trusted entity device maintaining a list of devices that are trusted within a domain, and the list of devices including the device; and means for establishing, based at least in part on the certificate, a connection with another device via a media access control (MAC) address.

Example DD, the system of Example CC, wherein the receiving the certificate from the trusted entity device enables the device and the another device to securely connect via the MAC address without the device having to broadcast the MAC address.

Example EE, the system of Example CC or Example DD, wherein the certificate indicates that the device is trusted by the trusted entity device, the system further comprising means for sending the certificate to the another device prior to establishing the connection to enable the another device to verify that the device is trusted by the trusted entity device.

Example FF, the system of Example EE, wherein the certificate is received at the device and from the trusted entity device in response to the device joining the domain, and independent of the device sending, to the trusted entity device, a specific request to connect to the another device.

Example GG, the system of Example CC or Example DD, wherein the certificate indicates that the another device is trusted by the trusted entity device and the certificate is received as part of a set of certificates respectively associated with a set of devices on the list of trusted devices, the device and the set of devices being included in a defined group of devices approved for automatic pairing.

Example HH, the system of Example GG, wherein the certificate is received at the device and from the trusted entity device in response to the device joining the domain, and independent of the device sending, to the trusted entity device, a specific request to connect to the another device.

Example II, the system of Example GG, wherein the device and the set of devices are associated with a same user account.

Example JJ, the system of any one of Example CC through Example II, wherein the domain comprises an enterprise domain and the list of devices includes devices registered to employees of a company that is served by the enterprise domain.

Example KK, a system comprising: means for issuing a hash function and a hash seed to a first device, the hash seed and the hash function usable to generate a hash chain that includes multiple versions; means for receiving, from a second device, a request to connect to the first device; means for determining a current version of the multiple versions of the hash chain that is being used by the first device to determine a media access control (MAC) address; and means for sending, to the second device, the hash function, the hash seed and the current version thereby enabling the second device to determine the MAC address and connect to the first device via the MAC address.

Example LL, the system of Example KK, further comprising: means for receiving, from the first device, an indication that the first device is changing from using the MAC address to using a new MAC address associated with a new version of the multiple versions of the hash chain; and means for providing the indication to the second device.

Example MM, the system of Example LL, wherein the indication is received based at least in part on a timing protocol associated with the hash function and usable to determine a time to change the MAC address.

Example NN, the system of Example LL, wherein the indication is received based at least in part on a determination that the MAC address has been compromised.

Conclusion

Although the present disclosure may use language that is specific to structural features and/or methodological operations, the disclosure is not limited to the specific features or operations described herein. Rather, the specific features and operations are disclosed as illustrative forms of implementing the disclosure.

What is claimed is:
1. A device comprising:
  a processing system comprising:
    one or more processors; and
    memory coupled to the one or more processors, the processing system configured to:
      maintain a list of devices known to be trusted within a same domain, wherein the domain comprises one or more networks operated by an entity and devices on the list of devices are approved for automatic pairing by the entity;

issue a hash function and a hash seed to a first device included in the list of devices, the hash seed and the hash function usable to generate a hash chain that includes multiple versions;

receive, from a second device included in the list of devices, a request to connect to the first device;

determine a current version of the multiple versions of the hash chain that is being used by the first device to determine a media access control (MAC) address; and send, to the second device and based on the inclusion of the second device in the list of devices, the hash function, the hash seed and the current version thereby enabling the second device to determine the MAC address and to securely connect to the first device using the MAC address without the MAC address being broadcast.

2. The device of claim 1, wherein the processing system is further configured to:

receive, from the first device, an indication that the first device is changing from using the MAC address to using a new MAC address associated with a new version of the multiple versions of the hash chain; and provide the indication to the second device.

3. The device of claim 2, wherein the indication is received based at least in part on a timing protocol associated with the hash function and usable to determine a time to change the MAC address.

4. The device of claim 3, wherein the timing protocol is implemented to periodically change the MAC address at a given time interval.

5. The device of claim 2, wherein the indication is received based at least in part on a determination that the MAC address has been compromised.

6. The device of claim 1, wherein the hash function is used to continually change the MAC address.

7. The device of claim 1, wherein:
the domain comprises an enterprise domain;
the entity comprises a company; and
the devices on the list of devices are given permissions to receive the hash function, the hash seed, and the current version.

8. A method comprising:
maintaining a list of devices known to be trusted within a same domain, wherein the domain comprises one or more networks operated by an entity and devices on the list of devices are approved for automatic pairing by the entity;

issuing a hash function and a hash seed to a first device included in the list of devices, the hash seed and the hash function usable to generate a hash chain that includes multiple versions;

receiving, from a second device included in the list of devices, a request to connect to the first device;

determining a current version of the multiple versions of the hash chain that is being used by the first device to determine a media access control (MAC) address; and sending, to the second device and based on the inclusion of the second device in the list of devices, the hash function, the hash seed and the current version thereby enabling the second device to determine the MAC address and to securely connect to the first device via the MAC address without the MAC address being broadcast.

9. The method of claim 8, further comprising:
receiving, from the first device, an indication that the first device is changing from using the MAC address to using a new MAC address associated with a new version of the multiple versions of the hash chain; and
providing the indication to the second device.

10. The method of claim 9, wherein the indication is received based at least in part on a timing protocol associated with the hash function and usable to determine a time to change the MAC address.

11. The method of claim 10, wherein the timing protocol is implemented to periodically change the MAC address at a given time interval.

12. The method of claim 9, wherein the indication is received based at least in part on a determination that the MAC address has been compromised.

13. The method of claim 8, wherein the hash function is used to continually change the MAC address.

14. The method of claim 8, wherein
the domain comprises an enterprise domain; and
the devices on the list of devices are given permissions to receive the hash function, the hash seed, and the current version.

15. One or more computer storage media comprising instructions that, when executed by one or more processors, cause a device to perform operations comprising:

maintaining a list of devices known to be trusted within a same domain, wherein the domain comprises one or more networks operated by an entity and devices on the list of devices are registered for automatic pairing by the entity;

issuing a hash function and a hash seed to a first device included in the list of devices, the hash seed and the hash function usable to generate a hash chain that includes multiple versions;

receiving, from a second device included in the list of devices, a request to connect to the first device;

determining a current version of the multiple versions of the hash chain that is being used by the first device to determine a media access control (MAC) address; and sending, to the second device and based on the inclusion of the second device in the list of devices, the hash function, the hash seed and the current version thereby enabling the second device to determine the MAC address and to securely connect to the first device via the MAC address without the MAC address being broadcast.

16. The one or more computer storage media of claim 15, wherein the operations further comprise:

receiving, from the first device, an indication that the first device is changing from using the MAC address to using a new MAC address associated with a new version of the multiple versions of the hash chain; and
providing the indication to the second device.

17. The one or more computer storage media of claim 16, wherein the indication is received based at least in part on a timing protocol associated with the hash function and usable to determine a time to change the MAC address.

18. The one or more computer storage media of claim 17, wherein the timing protocol is implemented to periodically change the MAC address at a given time interval.

19. The one or more computer storage media of claim 16, wherein the indication is received based at least in part on a determination that the MAC address has been compromised.

20. The one or more computer storage media of claim 15, wherein:
    the domain comprises an enterprise domain, and
    the devices on the list of devices are given permissions to receive the hash function, the hash seed, and the current version.

\* \* \* \* \*